(12) United States Patent
Parker et al.

(10) Patent No.: US 7,822,033 B1
(45) Date of Patent: Oct. 26, 2010

(54) MAC ADDRESS DETECTION DEVICE FOR VIRTUAL ROUTERS

(75) Inventors: David K. Parker, Cheltenham (GB); Denton Gentry, Fremont, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 765 days.

(21) Appl. No.: 11/324,209

(22) Filed: Dec. 30, 2005

(51) Int. Cl.
H04L 12/28 (2006.01)
H04L 12/56 (2006.01)

(52) U.S. Cl. ............... 370/392; 370/389; 370/401
(58) Field of Classification Search ........... 370/351, 370/389, 392, 401, 390, 402, 395.1, 399, 370/409; 709/226; 710/305; 711/203
See application file for complete search history.

(56) References Cited

U.S. PATENT DOCUMENTS

| | | | |
|---|---|---|---|
| 5,072,443 A | | 12/1991 | Hahne et al. |
| 5,282,270 A | | 1/1994 | Oppenheimer et al. |
| 5,473,599 A | * | 12/1995 | Li et al. ............ 370/219 |
| 5,764,636 A | | 6/1998 | Edsall |
| 5,852,607 A | * | 12/1998 | Chin ............ 370/401 |
| 5,923,660 A | * | 7/1999 | Shemla et al. ........ 370/402 |
| 5,999,518 A | | 12/1999 | Nattkemper et al. |
| 6,034,957 A | | 3/2000 | Haddock et al. |
| 6,098,109 A | * | 8/2000 | Kotzur et al. ........ 709/249 |
| 6,172,980 B1 | | 1/2001 | Flanders et al. |
| 6,173,333 B1 | | 1/2001 | Jolitz et al. |
| 6,208,649 B1 | | 3/2001 | Kloth |
| 6,256,314 B1 | * | 7/2001 | Rodrig et al. ........ 370/401 |
| 6,275,861 B1 | | 8/2001 | Chaudri et al. |
| 6,295,299 B1 | * | 9/2001 | Haddock et al. ........ 370/423 |
| 6,351,801 B1 | | 2/2002 | Christie et al. |
| 6,362,990 B1 | | 3/2002 | Gibson et al. |

(Continued)

FOREIGN PATENT DOCUMENTS

CN 101352003 1/2009

(Continued)

OTHER PUBLICATIONS

Van Ess, D., *A Circular FIFO, PSoC Style*, Cypress Microsystems, Application Note AN2036, Rev. B, pp. 1-5, Jun. 21, 2002.

(Continued)

*Primary Examiner*—Jayanti K Patel
*Assistant Examiner*—Christopher T Wyllie
(74) *Attorney, Agent, or Firm*—Blakely, Sokoloff, Taylor & Zafman

(57) ABSTRACT

A MAC address detector for a networking device is provided, the device configured to present different virtual routers to different end users, classes of service or packets. First addressing logic provides a pool of N potential MAC addresses of the device, wherein N is an integer of one or more. Second addressing logic generates a (N+1)th potential MAC address of the device by combining a permanent or semi-permanent identifier of the device, for example, a chassis identifier, with a virtual router identifier determined responsive to the packet. Comparison logic indicates which if any of the (N+1) potential MAC addresses match the destination MAC address from the packet. Enable logic selectively activates responsive to the packet any of the (N+1) potential MAC addresses. Detection logic asserts a device address detection signal if any activated ones of the (N+1) potential MAC addresses match the destination address from the packet.

17 Claims, 4 Drawing Sheets

U.S. PATENT DOCUMENTS

| | | | |
|---|---|---|---|
| 6,381,162 B1 | 4/2002 | Peterson | |
| 6,381,242 B1 | 4/2002 | Maher, III et al. | |
| 6,384,750 B1 | 5/2002 | Brown | |
| 6,397,260 B1* | 5/2002 | Wils et al. | 709/238 |
| 6,463,067 B1 | 10/2002 | Hebb et al. | |
| 6,515,963 B1 | 2/2003 | Bechtolsheim et al. | |
| 6,553,002 B1 | 4/2003 | Bremer et al. | |
| 6,570,877 B1 | 5/2003 | Kloth et al. | |
| 6,631,465 B1 | 10/2003 | Chen et al. | |
| 6,658,002 B1 | 12/2003 | Ross et al. | |
| 6,661,791 B1 | 12/2003 | Brown | |
| 6,735,670 B1 | 5/2004 | Bronstein et al. | |
| 6,738,892 B1 | 5/2004 | Coon et al. | |
| 6,763,023 B1* | 7/2004 | Gleeson et al. | 370/392 |
| 6,765,881 B1 | 7/2004 | Rajakarunanayake | |
| 6,792,502 B1 | 9/2004 | Pandya et al. | |
| 6,842,791 B2* | 1/2005 | Navada et al. | 710/1 |
| 6,871,262 B1 | 3/2005 | Oren et al. | |
| 6,882,642 B1 | 4/2005 | Kejriwal et al. | |
| 6,888,797 B1* | 5/2005 | Cao et al. | 370/235 |
| 6,914,905 B1 | 7/2005 | Yip | |
| 6,917,617 B2 | 7/2005 | Jin et al. | |
| 6,957,258 B2 | 10/2005 | Maher, III et al. | |
| 6,975,581 B1* | 12/2005 | Medina et al. | 370/401 |
| 6,976,158 B2 | 12/2005 | Catherwood et al. | |
| 6,980,552 B1 | 12/2005 | Belz et al. | |
| 6,999,462 B1 | 2/2006 | Acharya | |
| 7,062,398 B1 | 6/2006 | Rothberg | |
| 7,062,641 B1 | 6/2006 | Devanagondi et al. | |
| 7,079,407 B1 | 7/2006 | Dimitrelis | |
| 7,092,354 B2* | 8/2006 | Jensen | 370/218 |
| 7,111,101 B1* | 9/2006 | Bourke et al. | 710/305 |
| 7,139,271 B1 | 11/2006 | Parruck et al. | |
| 7,152,191 B2 | 12/2006 | Kessler et al. | |
| 7,154,902 B1 | 12/2006 | Sikdar | |
| 7,190,696 B1* | 3/2007 | Manur et al. | 370/392 |
| 7,212,837 B1 | 5/2007 | Calhoun et al. | |
| 7,248,584 B2 | 7/2007 | Hooper | |
| 7,248,585 B2 | 7/2007 | Kohn et al. | |
| 7,260,648 B2* | 8/2007 | Tingley et al. | 709/245 |
| 7,274,693 B1 | 9/2007 | Kloth et al. | |
| 7,286,520 B2* | 10/2007 | Takeda et al. | 370/349 |
| 7,296,100 B1 | 11/2007 | Venkatesh et al. | |
| 7,304,996 B1 | 12/2007 | Swenson et al. | |
| 7,444,405 B2* | 10/2008 | Gangadharan | 709/226 |
| 7,487,938 B2* | 2/2009 | Brady et al. | 244/118.5 |
| 7,515,589 B2* | 4/2009 | Bacher et al. | 370/392 |
| 7,561,531 B2* | 7/2009 | Lewites et al. | 370/254 |
| 2001/0005876 A1 | 6/2001 | Srinivasan et al. | |
| 2001/0015976 A1 | 8/2001 | Harasawa et al. | |
| 2001/0025315 A1 | 9/2001 | Jolitz | |
| 2001/0028651 A1 | 10/2001 | Murase | |
| 2001/0048661 A1* | 12/2001 | Clear et al. | 370/218 |
| 2002/0184387 A1* | 12/2002 | Yamaya et al. | 709/238 |
| 2002/0191605 A1 | 12/2002 | Lunteren et al. | |
| 2003/0005210 A1 | 1/2003 | Thummalapally et al. | |
| 2003/0026259 A1* | 2/2003 | Brown | 370/392 |
| 2003/0028713 A1 | 2/2003 | Khanna et al. | |
| 2003/0069973 A1 | 4/2003 | Ganesan et al. | |
| 2003/0154380 A1 | 8/2003 | Richmond et al. | |
| 2003/0169612 A1 | 9/2003 | Hu | |
| 2003/0193949 A1 | 10/2003 | Kojima et al. | |
| 2004/0003110 A1 | 1/2004 | Ozguner | |
| 2004/0015683 A1 | 1/2004 | Emma et al. | |
| 2004/0100956 A1 | 5/2004 | Watanabe | |
| 2004/0120173 A1 | 6/2004 | Regev et al. | |
| 2004/0202162 A1 | 10/2004 | Vu | |
| 2004/0205056 A1* | 10/2004 | Mori et al. | 707/3 |
| 2004/0205753 A1 | 10/2004 | Moore | |
| 2004/0208197 A1 | 10/2004 | Viswanathan | |
| 2004/0246981 A1 | 12/2004 | Zhiqun | |
| 2004/0258062 A1* | 12/2004 | Narvaez | 370/389 |
| 2005/0055339 A1 | 3/2005 | Richardson | |
| 2005/0074009 A1 | 4/2005 | Kanetake | |
| 2005/0180429 A1* | 8/2005 | Ghahremani et al. | 370/395.21 |
| 2005/0190639 A1 | 9/2005 | Hu | |
| 2005/0198362 A1 | 9/2005 | Navada et al. | |
| 2005/0226242 A1 | 10/2005 | Parker | |
| 2005/0281191 A1* | 12/2005 | McGee et al. | 370/216 |
| 2006/0007917 A1 | 1/2006 | Saito et al. | |
| 2006/0039374 A1 | 2/2006 | Belz et al. | |
| 2006/0056420 A1* | 3/2006 | Okuda et al. | 370/395.54 |
| 2006/0092950 A1* | 5/2006 | Arregoces et al. | 370/396 |
| 2006/0106934 A1* | 5/2006 | Figaro et al. | 709/227 |
| 2006/0233168 A1* | 10/2006 | Lewites et al. | 370/389 |
| 2007/0153808 A1* | 7/2007 | Parker et al. | 370/395.53 |
| 2007/0291791 A1 | 12/2007 | English et al. | |
| 2008/0034112 A1* | 2/2008 | Imai et al. | 709/238 |
| 2008/0075078 A1* | 3/2008 | Watanabe | 370/390 |
| 2008/0186968 A1* | 8/2008 | Farinacci et al. | 370/392 |
| 2008/0205264 A1* | 8/2008 | Rorie | 370/219 |
| 2008/0222094 A1* | 9/2008 | Cox | 707/3 |

FOREIGN PATENT DOCUMENTS

| | | |
|---|---|---|
| WO | WO 03/081857 | 10/2003 |
| WO | WO-2007079035 | 7/2007 |

OTHER PUBLICATIONS

Network Working Group, *RFC 1071—Computing the Internet Checksum*, Sep. 1988, available at: http://www.faqs.org/rfcs/rfc1071.html.

Network Working Group, *RFC 1141—Incremental Updating of the Internet Checksum*, Jan. 1990, available at: http://www.faqs.org/rfcs/rfc1141.html.

Network Working Group, *RFC 1624—Computation of the Internet Checksum via incremental update*, May 1994, available at: http://www.faqs.org/rfcs/rfc1624.html.

Netlogic Microsystems, Product Brief NSE5000GLQ, Copyright 2004, available at: http://www.netlogicmicro.com/datasheets/nse5000glq.html.

Zhang, Z., *Recovery of Memory and Process in DSM Systems: HA Issue #1*, Hewlett-Packard Co. HPL-2001-76, Mar. 30, 2001.

Non-Final Office Action for U.S. Appl. No. 11/324,159 Mailed Sep. 4, 2008, 33 Pages.

Final Office Action for U.S. Appl. No. 11/324,159 Mailed Apr. 3, 2009, 28 Pages.

Non-Final Office Action for U.S. Appl. No. 11/324,159 Mailed Nov. 12, 2009, 31 Pages.

Non-Final Office Action for European Appl. No. 06846017.9 Mailed Apr. 16, 2009, 5 Pages.

International Search Report and WO for PCT Application PCT/US2006/049107 Mailed May 15, 2007, 14 Pages.

International Preliminary Report on Patentability for PCT Application PCT/US2006/049107 Mailed Jul. 10, 2008, 8 Pages.

Non-Final Office Action for U.S. Appl. No. 11/324,159 Mailed on Jun. 8, 2010, 17 Pages.

* cited by examiner

MAC ADDRESS DETECTION DEVICE FOR VIRTUAL ROUTERS

This application is related to U.S. patent application Ser. No. 11/324,159, entitled "METHOD OF PROVIDING VIRTUAL ROUTER FUNCTIONALITY," filed concurrently herewith; U.S. patent application Ser. No. 11/323,998, entitled "METHOD OF PROVIDING VIRTUAL ROUTER FUNCTIONALITY THROUGH ABSTRACTED VIRTUAL IDENTIFIERS," filed concurrently herewith; and U.S. patent application Ser. No. 11/324,205, entitled "METHOD OF EXTENDING DEFAULT, FIXED NUMBER OF PROCESSING CYCLES IN PIPELINED PACKET PROCESSOR ARCHITECTURE," filed concurrently herewith, each of which is hereby incorporated by reference herein as though set forth in full.

BACKGROUND OF THE INVENTION

1. Field of the Invention

This application relates generally to networking devices, and, more specifically, networking devices that present different virtual router configurations to different end users, classes of service or packets.

2. Related Art

Virtual router functionality refers to the capability of the same physical networking device of presenting different virtual router configurations to different end users, classes of desired service, or packets. As a result of this capability, the same physical networking device appears as a plurality of different virtual routers.

Virtual router functionality complicates the process of determining whether the destination Media Access Control (MAC) address in an incoming packet matches the MAC address of the device, indicating that the packet should be routed (at OSI layer three), not switched (at OSI layer two). One complication arises because each virtual router could have a different MAC address, and so the same physical networking device must be capable of detecting matches with the MAC addresses for all the virtual routers the device is capable of presenting.

Current networking devices are assigned a fixed allocation of MAC addresses to handle various redundancy protocols, such as the Virtual Router Redundancy Protocol (VRRP) and the Extreme Standby Router Protocol (ESRP™). According to these protocols, a master-slave relationship is maintained between each device and a shadow device assigned to it. When a master device is disabled for any reason, the slave device takes over the functionality of the master, including taking over its MAC and IP address. The MAC address of the master, stored in a pool of MAC addresses assigned to the slave, is activated so that it functions as the MAC address of the slave.

However, the fixed number of MAC addresses assigned to a device is generally insufficient to comply with the dual requirements imposed by the redundancy protocols and the needs of virtual routing. Moreover, an increase in the fixed allocation of MAC addresses assigned to a device to handle both requirements tends to be wasteful of memory and also tends to scale poorly with an increase in the number of virtual routers that the device is capable of presenting.

SUMMARY

The invention provides a MAC address detector for use in a networking device capable of presenting different virtual routers to different end users, classes of service, or packets.

First addressing logic is configured to provide a pool of N potential MAC addresses, wherein N is an integer of one or more. Each member of the pool can be activated for any purpose, including, for example, complying with a redundancy protocol calling for the device to assume one of the MAC addresses in the pool.

Second addressing logic is configured to generate an (N+1) th potential MAC address of the device by combining a permanent or semi-permanent, unique identifier of the device, for example, a chassis identifier stored in a backplane EEPROM in the device, with a virtual router identifier determined responsive to a packet.

Enable logic is configured to selectively activate any of the (N+1) potential MAC addresses of the device responsive to the packet.

Comparison logic is configured to indicate which if any of the (N+1) potential MAC addresses of the device match a destination MAC address derived from the packet.

Detection logic is configured to assert a device address detection signal if any activated ones of the (N+1) potential MAC addresses of the device match the destination MAC address derived from the packet.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
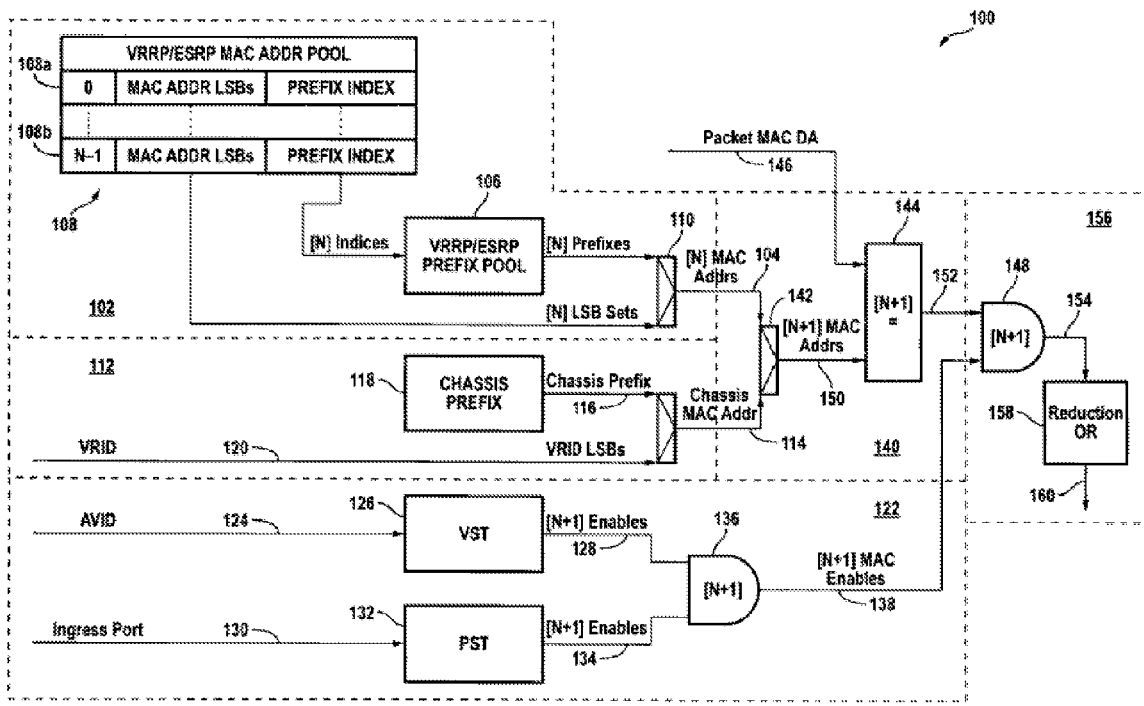
FIG. 1 is a block diagram of one embodiment of a MAC address detector for use in a networking device that is capable of presenting different virtual routers to different end users, classes of service, or packets, characterized by distinct first and second addressing logic that separately handles the needs of redundancy protocols and "heavyweight" virtual router functionality.

FIG. 1 illustrates a block diagram of an embodiment 100 of a MAC address detector. The detector is for use in a networking device capable of presenting different virtual routers to different end users, classes of service, or packets. In this particular embodiment, the detector comprises first addressing logic 102 for providing a pool or group 104 of N potential MAC addresses of the device, wherein N is an integer of one or more. Each of the MAC addresses in the pool is available for assigning to the device for any purpose, including in support of any applicable redundancy protocol, such as VRRP or ESRP™, or in support of the device acting as a "lightweight" virtual router, i.e., one that virtually routes at OSI layer three. The detector may be included in any networking device that is capable of forwarding or classifying packets at OSI layer three or above, including but not necessarily limited to routers, switches, or combination routers/switches. For purposes of this disclosure, a "virtual router" includes both a "lightweight" virtual router, i.e., one that virtually routes at OSI layer three, and a "heavyweight" virtual router, i.e., one that virtually routes at OSI layer three, but in addition implements distinct OSI layer two functions per virtual router. Additionally, for purposes of this disclosure, the singular terms "device" or "router" include multiple devices or routers, respectively.

In one implementation, the first addressing logic 102 comprises memory 107 holding a first table 106 having N entries, each entry holding a particular MAC address prefix. The first addressing logic 102 further comprises memory 109 (shown as distinct from memory 107 for purposes of illustration only) holding a second table 108 having N entries 108a, 108b, each entry holding a MAC address suffix and an index to an entry in the first table 106 holding a corresponding MAC address prefix. Combining logic 110 is configured to concatenate a prefix from the first table 106 to a corresponding suffix from the second table 106 N times, once for each entry in the table 108, to form the pool of N potential MAC addresses 104. In general, the prefixes in the table 106 may vary depending on the application. For example, one prefix may apply to VRRP, another to ESRP™, a third for "lightweight" virtual router purposes, etc.

For purposes of this disclosure, the term "logic" refers to implementations in hardware, software or combinations of hardware and software.

The detector further comprises second addressing logic 112 for generating an (N+1)th potential MAC address 114 by combining a permanent or semi-permanent, unique identifier of the device with a virtual router identifier 120 determined responsive to a packet. In one embodiment, the identifier is a chassis identifier 116 that is stored in a backplane EEPROM 118 in the device. Additionally, the virtual router identifier 120 is determined by applying a indirection mapping process to a key derived from one or more fields derived from or associated with the packet, including VMAN, VLAN and/or ingress port fields, as further explained in U.S. patent application Ser. No. 11/324,159, filed concurrently herewith, which is hereby fully incorporated by reference herein as though set forth in full.

Figure 3:
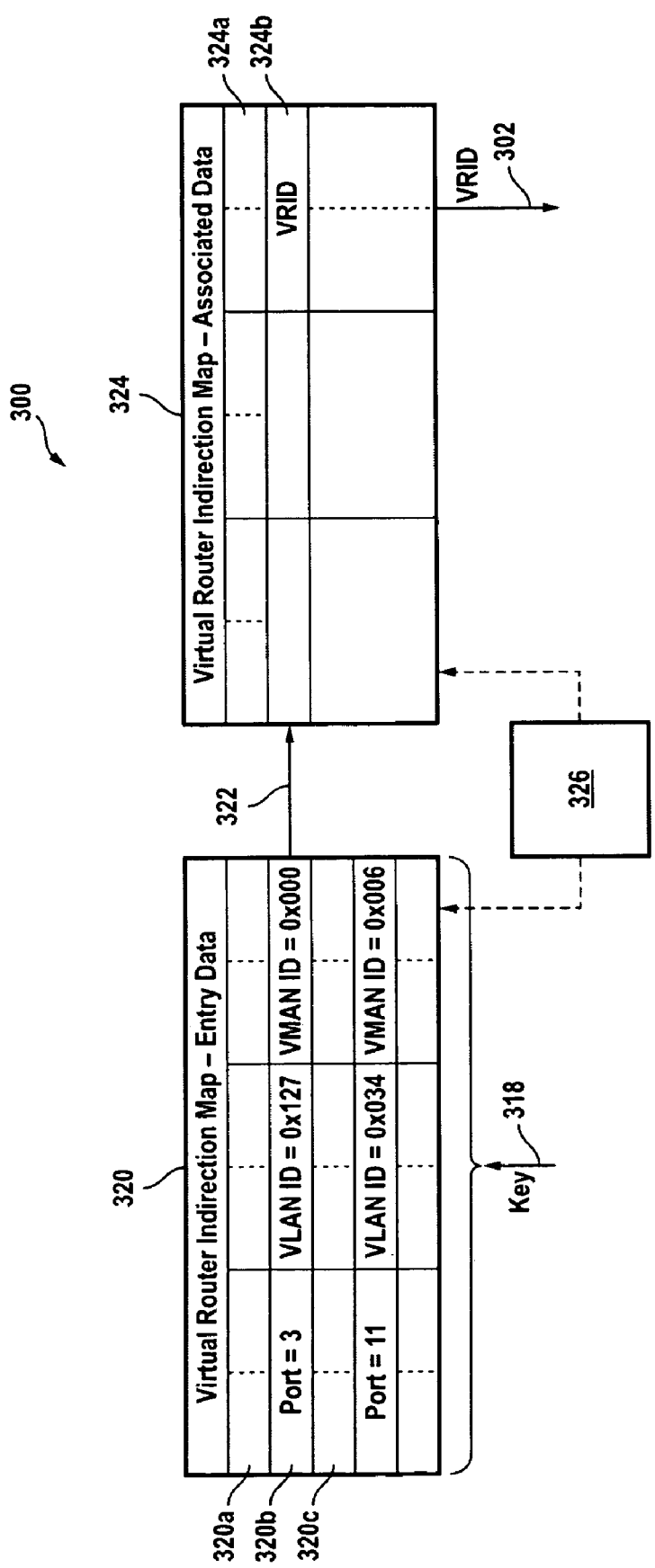
FIG. 3 illustrates one embodiment of an indirection mapping process for mapping a key to a virtual router identifier.

Referring to FIG. 3, in one embodiment 300 of this indirection mapping technique, a key 318, formed by concatenating VMAN, VLAN and ingress ports fields of the packet, is mapped into a virtual router identifier (VRID) 302 using a two-step indirection mapping process performed by logic 326. In the first step, as illustrated, a table 320 is accessed, the table having a plurality of entries 320a, 320b, 320c, each having a content value and an index value, and locating an entry having a content value that matches the key. In FIG. 3, the content value of entry 320b is shown as matching the key 318. The index value of the matching entry, identified with numeral 322, forms an input to the second step of the process.

In the second step, the index value 322 of the matching entry 320b is mapped into the VRID 302 using an associated data store element 324. The associated data store element 324 has a plurality of entries 324a, 324b, each having an index value and a content value. In one embodiment, the mapping is performed by selecting the entry in the associated data store element 324 whose index value matches the index value 322 for the matching entry in the table 320. In the particular example illustrated in FIG. 3, entry 324b satisfies this condition. The content value of this entry is or contains the VRID 302.

In this particular embodiment, the MAC address generated by this second addressing logic 112 is intended to apply when the device is configured to function as a "heavyweight" virtual router, i.e., a device that virtually routes at OSI layer three, but in addition implements distinct OSI layer two functions per virtual router.

Enable logic 122 is configured to activate, i.e., assign to the device, one or more of the (N+1) potential MAC addresses responsive to the packet. In one implementation, an abstracted VLAN identifier (AVID) 124 is derived from the packet by applying an indirection mapping process to a key derived from one or more fields in or associated with the packet, including VMAN, VLAN and/or ingress port fields, as further explained in U.S. patent application Ser. No. 11/323,998, filed concurrently herewith, which is hereby fully incorporated by reference herein as though set forth in full.

Figure 4:
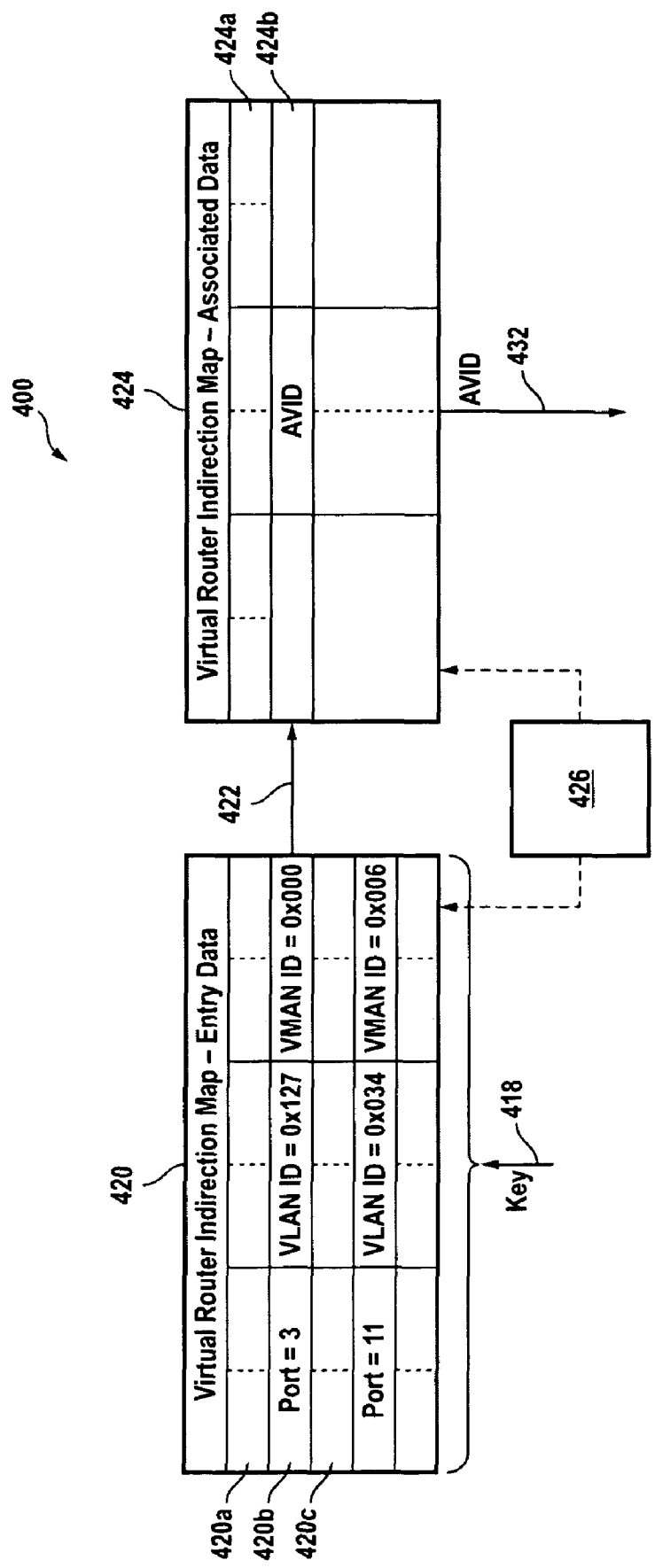
FIG. 4 illustrates one embodiment of an indirection mapping process for mapping a key to an abstracted VLAN identifier.

Referring to FIG. 4, in one embodiment 400 of this indirection technique, a key 418, formed by concatenating VMAN, VLAN and ingress port fields of the packet, is mapped into an abstracted VLAN identifier (AVID) 432 using a two-step indirection mapping process performed by logic 426. In the first step, as illustrated, a table 420 is accessed, the table having a plurality of entries 420a, 420b, 420c, each having a content value and an index value, and locating an entry having a content value that matches the key. In FIG. 4, the content value of entry 420b is shown as matching the key 418. The index value of the matching entry, identified with numeral 422, forms an input to the second step of the process.

In the second step, the index value 422 of the matching entry 420b is mapped into the AVID 432 using an associated data store element 424. The associated data store element 424 has a plurality of entries 424a, 424b, each having an index value and a content value. In one embodiment, the mapping is performed by selecting the entry in the associated data store element 424 whose index value matches the index value 422 for the matching entry in the table 420. In the particular example illustrated in FIG. 4, entry 424b satisfies this condition. The content value of this entry is or contains the AVID 432.

This AVID value is used to address an entry in VLAN state table 126, a table held in memory 127 and having a plurality of entries, each entry indicating for a particular AVID value which of the (N+1) potential MAC addresses of the device are to be activated, i.e., assigned to the device. The addressed entry, which has an enable bit for each of the (N+1) potential MAC addresses, is retrieved and held for input to AND logic 136. If "asserted," the enable bit indicates the corresponding address is to be activated; if not "asserted" the enable bit indicates the corresponding address is not to be activated. One of skill in the art will appreciate that "asserted" may either mean presenting a logical "1" or a logical "0" depending on the application or implementation.

enable logic 122 in this implementation further comprises memory 129 (shown as distinct from memory 127 for purposes of illustration only) holding a port state table 132 having a plurality of entries, each entry indicating for a particular ingress port value those of the (N+1) potential MAC addresses that are to be activated. The ingress port at which the packet arrived at the device is used to address one of these entries. The addressed entry, which has an enable bit for each of the (N+1) potential MAC addresses, is retrieved and held for input to AND logic 136. Again, if set, the enable bit indicates the corresponding address is to be activated; if clear, it indicates the corresponding address is not to be activated.

AND logic 136 is configured to receive the addressed entry from the first table 126 and the addressed entry from the second table 132 and provide an output signal 138 indicating for each of the (N+1) potential MAC addresses whether that address is activated or not. In the particular implementation illustrated, AND logic 136 outputs a (N+1) bit wide signal 138, one bit for each of the (N+1) potential_MAC addresses. AND logic 136 sets that bit to the logical AND of the two corresponding bits in the addressed entries from tables 126 and 132. Therefore, a particular is activated only if both entries agree in this respect, i.e., if the enable bits in both entries corresponding to the address are asserted. If the two entries disagree, the corresponding bit in the output signal 138 is not asserted, indicating the corresponding address is not to be activated.

Comparison logic 140 is configured to indicate which if any of the (N+1) potential MAC addresses match a destination MAC address 146 derived from the packet. As illustrated, combiner 142 combines the N potential MAC addresses from the first addressing logic 102 with the (N+1)th potential MAC address from the second addressing logic 112 to form an output signal 150 that comprises a vector of each of the (N+1) potential MAC addresses.

Comparator 144 is configured to compare each of the (N+1) potential MAC addresses of the device, as contained in the vector 150, with the destination MAC address 146 from the packet, and output a comparison signal 152 indicating, for each of the (N+1) MAC addresses, whether there is a match or not. In the particular embodiment illustrated, the comparison signal 152 is a (N+1) bit wide signal, with one bit for each of (N+1) potential MAC addresses. The bit corresponding to a particular address is asserted if the address matches the destination MAC address 146 from the packet. Otherwise, it is not asserted.

Detection logic 156 is configured to assert a device address detection signal 160 if any activated ones of the (N+1) potential MAC addresses match the destination MAC address derived from the packet. In the embodiment illustrated, the detection logic 156 comprises gating logic 148 and reduction OR circuit 158.

Gating logic 148 is configured to "gate" the comparison signal 152 based on the output signal 138 from the enable logic 122. In the particular embodiment illustrated, the comparison signal 152 is a (N+1) bit wide signal, with each bit corresponding to one of the (N+1) addresses and indicating whether that address matches the destination MAC address 146 from the packet or not. In addition, the output signal 138 from the enable logic is also a (N+1) bit wide signal, with each bit corresponding to one of the (N+1) addresses and indicating whether that address has been enabled, i.e., activated, or not. In this implementation, gating logic 148 logically ANDs the corresponding bits in the signals 138, 152 together, forming an (N+1) bit wide output signal 154, with each bit in signal 154 corresponding to one of the (N+1) addresses. Each bit in the output signal 154 is asserted if the corresponding address is both activated and matches the destination MAC address 146 from the packet. Otherwise, the bit is not asserted.

The reduction OR circuit 158 asserts the device address detection signal 160 if any of the bits in the (N+1) bit wide signal 154 output from the comparison logic 140 is asserted.

This embodiment overcomes one or more of the problems identified at the outset with the conventional approach. In lieu of sharing a fixed pool of MAC addresses for the needs of redundancy protocols and virtual routers, for example, the embodiment allocates a pool of N addresses for use in satisfying the needs of redundancy protocols and "lightweight" virtual routing, and generates an (N+1)st address for use in satisfying the needs of "heavyweight" virtual routing. This separation avoids the contention problems that plague the conventional approach.

The embodiment also conserves memory and better scales with an increase in the number of potential MAC addresses allocated to the device compared with the conventional approach.

Consider first addressing logic 102. In the embodiment illustrated in FIG. 1, that logic generates a pool of N MAC addresses by concatenating MAC address prefixes from table 106 with MAC address suffixes from table 108. Since there are N possible prefixes from table 106, and N possible suffixes from table 108, the logic is capable of generating $N^2$ unique MAC addresses that may be assigned to the device. Yet, it requires far less storage to implement and also scales much better with an increase in N than an approach that stores each of the $N^2$ addresses in a memory. For example, assuming N is eight, table 106 holds eight possible 40-bit MAC address prefixes, and table 108 holds eight possible 8-bit MAC address suffixes and a 3-bit index to table 106 for each entry, the two tables are together capable of generating 64 unique 48-bit MAC addresses, while requiring only 408 bits of storage, far less than the 3,072 bits required to hold the 64 addresses.

Consider also second addressing logic 104. In the embodiment illustrated in FIG. 1, logic 104 is capable of generating a block of all the MAC addresses needed to implement "heavyweight" virtual router functionality while requiring very little storage. For example, assuming logic 104 appends a chassis prefix of 43 bits to a suffix formed from the lower 5 significant bits of the virtual router identifier 120, the logic 104 is capable of generating a block of 32 unique MAC addresses, each of which may be assigned to the device, while requiring only 43 bits of EEPROM storage needed to store the chassis prefix, far less than the 1,536 bits required to hold all 32 addresses.

Consider thirdly the enable logic 122. In the embodiment illustrated in FIG. 1, by using an abstracted VLAN identifier as an index to VLAN state table 126, instead of an index based on the VLAN itself, or an index based on the combination of the virtual router identifier 120 in combination with a virtual port identifier (formed from the combination of the VLAN and ingress port identifiers), and also by using the ingress port identifier as a separate index to port state table 132, the combined sizes of the tables 126, 132 is dramatically reduced. Moreover, the combined size of the tables scales much better with an increase in the number of virtual routers, virtual ports and/or VLANs allocated to the device.

Additionally, it should be appreciated that an embodiment is possible in which the comparison logic 140 only compares activated ones of the (N+1) potential MAC addresses with the destination MAC address derived from the packet, and only provides an output signal indicating which if any activated ones of the (N+1) addresses match the destination MAC address from the packet.

Figure 2:
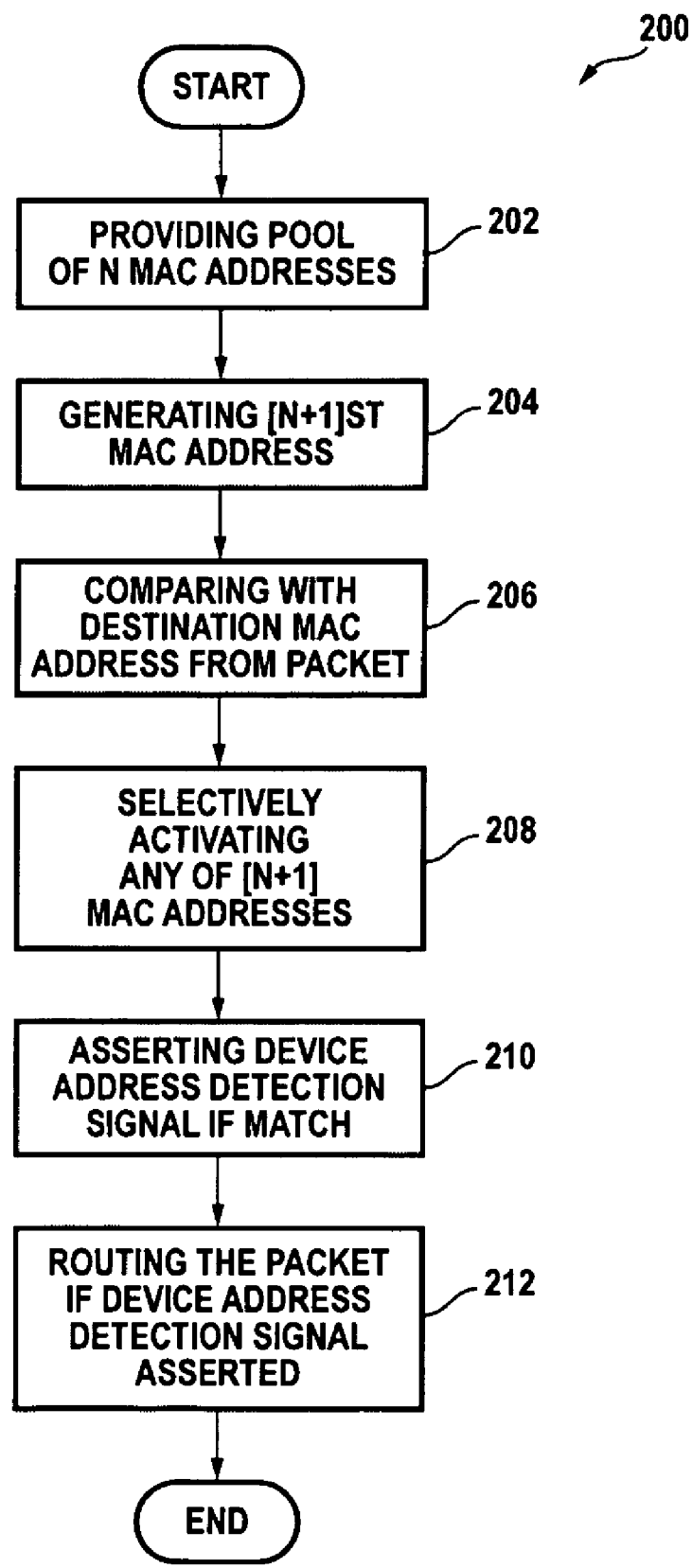
FIG. 2 is a flowchart illustrating one embodiment of a method of routing a packet that may be practiced in the detector of FIG. 1.

FIG. 2 illustrates an embodiment 200 of a method of routing a packet in a networking device capable of presenting different virtual routers to different end users, classes of service, or packets.

In this embodiment, step 202 comprises providing a pool of N potential MAC addresses, wherein N is an integer of one or more. In the implementation of FIG. 1, this step comprises providing a first table 106 having N entries, each entry holding a MAC address prefix; providing a second table 108 having N entries, each entry holding a MAC address suffix and an index to an entry in the first table holding a corresponding MAC address prefix; and combining each prefix from the first table with a corresponding suffix from the second table to form the pool of N potential MAC addresses.

Step 204 comprises generating a (N+1)st potential MAC address by combining a permanent or semi-permanent, unique identifier of the device with a virtual router identifier determined responsive to a packet. In the implementation illustrated in FIG. 1, this step comprises concatenating a unique chassis identifier 116, stored in a backplane EEPROM 118, to the virtual router identifier 120 determined by applying a indirection mapping process to a key derived from one or more fields derived from or associated with the packet, including VMAN, VLAN and/or ingress port fields, as further explained in U.S. patent application Ser. No. 11/324,159, filed concurrently herewith, which is hereby fully incorporated by reference herein as though set forth in full. In the resulting concatenated address, the chassis identifier forms the address prefix, and the virtual router identifier 120 (or a subset of that identifier) forms the address suffix.

Step 206 comprises comparing each of the (N+1) potential MAC addresses with a destination MAC address derived from the packet, and indicating whether or note there is a match for each of these addresses. Step 208 comprises selectively activating, responsive to the packet, any of the (N+1) potential MAC addresses. In the implementation of FIG. 1, this step comprises providing a first table 126 having a plurality of entries, each entry associated with a particular value of an abstracted VLAN identifier derived by applying an indirection mapping process to one or more fields in or associated with the packet, including VMAN, VLAN and/or ingress port fields, as further explained in U.S. patent application Ser. No. 11/323,998, filed concurrently herewith, which is hereby fully incorporated by reference herein as though set forth in full. Each entry of table 126 also indicates for each of the (N+1) potential MAC addresses whether that address is to be activated.

In the implementation illustrated in FIG. 1, step 208 further comprises providing a second table 132 having a plurality of entries, each entry associated with a particular ingress port and indicating for each of the (N+1) potential MAC addresses whether that address is to be activated; accessing an entry from the first table 126 associated with the AVID derived from the packet; accessing an entry from the second table 132 associated with an ingress port at which the packet was received at the device; and checking each of the potential (N+1) potential MAC addresses and activating one or more of these addresses only if both entries agree that the one or more addresses are to be activated.

Step 210 comprises asserting a device address detection signal if there is a match between any activated ones of the (N+1) potential MAC addresses and the destination MAC address derived from the packet.

Step 212 comprises routing the packet (at OSI layer three) if the device address detection signal is asserted, and switching (at OSI layer two) the packet otherwise.

Additionally, it should be appreciated that an embodiment is possible in which the comparing step 206 comprises comparing activated ones of the (N+1) potential MAC addresses with the destination MAC address from the packet, and indicating which if any activated ones of the (N+1) potential MAC addresses match the destination MAC address from the packet.

While various embodiments of the invention have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. In a networking device capable of presenting different virtual routers to different end users, classes of service, or packets, a MAC address detector comprising:

memory holding a first table having N entries, each entry holding a MAC address prefix;

memory holding a second table having N entries, each entry holding a MAC address suffix and an index to an entry in the first table holding a corresponding MAC address prefix;

combining logic for combining each prefix from the first table with a corresponding suffix from the second table to form a pool of N potential MAC addresses, wherein N is an integer of one or more;

addressing logic for generating an (N+1)th potential MAC address of the networking device by combining a permanent or semi-permanent, unique identifier of the networking device with a virtual router identifier determined responsive to a packet received at the networking device, the (N+1)th potential MAC address in combination with the N potential MAC addresses forming a plurality of potential MAC addresses that are available for activation and assignment to the networking device;

enable logic for activating and assigning, one or more of the plurality of potential MAC addresses the networking device responsive to the packet received at the networking device;

comparison logic for indicating whether any of the one or more potential MAC addresses assigned to the networking device match a destination MAC address derived from the packet received; and detection logic for asserting a device address detection signal if any of the one or more potential MAC addresses assigned to the networking device match the destination MAC address derived from the packet received.

2. The detector of claim 1
wherein each MAC address has a size, and the memory needed to hold the first and second tables has a size that is less than $N^2$ multiplied by the size of each MAC address.

3. The detector of claim 1 wherein the virtual router identifier is derived through an indirection mapping process applied to one or more fields in or associated with the packet, including a VLAN field.

4. The detector of claim 1 wherein the comparison logic is configured to indicate which if any of the plurality of potential MAC addresses match the destination MAC address derived from the packet.

5. The detector of claim 4 wherein the comparison logic comprises:

a comparator for comparing each of the plurality of potential MAC addresses of the device with the destination MAC address from the packet, and outputting a comparison signal for each of the plurality of MAC addresses indicating whether there is a match or not.

6. The detector of claim 1 wherein an abstracted VLAN identifier (AVID) is derived from the packet by applying an indirection mapping process to one or more fields in or associated with the packet, including a VLAN field, wherein the packet is received by the device at an ingress port, and the enable logic comprises:

memory holding a first table having a plurality of entries, each entry indicating for a particular AVID value which of the plurality of potential MAC addresses are activated;

memory holding a second table having a plurality of entries, each entry indicating for a particular ingress port value which of the plurality of potential MAC addresses are activated;

logic for receiving an entry from the first table associated with the abstracted VLAN identifier (AVID) derived from the packet, for receiving an entry from the second table associated with the ingress port on which the packet was received at the device, and for indicating whether each of the plurality of potential MAC addresses is activated, and also for indicating that a particular MAC address is activated only if both entries agree in this respect.

7. The detector of claim 5 wherein the detection logic comprises:

gating logic for outputting the comparison signal only for activated ones of the plurality of potential MAC addresses; and a reduction OR circuit for asserting the device address detection signal if any activated ones of the plurality of potential MAC addresses match the destination MAC address from the packet.

8. In a networking device capable of presenting different virtual routers to different end users, classes of service, or packets, a MAC address detector comprising:

a first table having N entries, wherein N is an integer greater than one, each entry holding a MAC address prefix;

a second table having N entries, each entry holding a MAC address suffix and an index to an entry in the first table holding a corresponding MAC address prefix;

combining logic for combining each suffix from the second table with a corresponding prefix from the first table to form a pool of N potential MAC addresses of the networking device;

addressing logic for generating an (N+1)th potential MAC address of the networking device by combining a permanent or semi-permanent, unique identifier of the networking device with a virtual router identifier determined responsive to a packet received at the networking device, the (N+1)th potential MAC address in combination with the N potential MAC addresses forming a plurality of potential MAC addresses that are available for activation and assignment to the networking device;

enable logic for selectively activating and assigning one or more of the plurality of potential MAC addresses to the networking device responsive to the packet received at the networking device;

comparison logic for indicating whether any activated ones of the one or more potential MAC addresses match a destination MAC address derived from the packet received; and detection logic for asserting a device address detection signal if any activated ones of the plurality of potential MAC addresses match the destination MAC address derived from the packet received.

9. The detector of claim 8 wherein the comparison logic is configured to indicate which if any of the plurality of potential MAC addresses match a destination MAC address derived from the packet.

10. In a networking device capable of presenting different virtual routers to different end users, classes of service, or packets, a method of routing a packet comprising:

receiving a packet at the networking device;

storing in a memory of the networking device, a first table having N entries, wherein each entry comprises a MAC address prefix;

storing in the memory of the networking device, a second table having N entries, each entry comprising a MAC address suffix and an index to an entry in the first table holding a corresponding MAC address prefix;

combining each prefix from the first table with a corresponding suffix from the second table to form a pool of N potential MAC addresses of the networking device, wherein N is an integer of one or more;

generating an (N+1)th potential MAC address of the networking device by combining a permanent or semi-permanent, unique identifier of the networking device with a virtual router identifier determined responsive to receiving the packet at the networking device, the (N+1)th potential MAC address in combination with the N potential MAC addresses forming a plurality of potential MAC addresses of the networking device that are available for activation and therefore assignment to the networking device;

activating and assigning one or more of the plurality of potential MAC addresses to the networking device responsive to receiving the packet at the networking device;

indicating whether any of the one or more potential MAC addresses assigned to the networking device match a destination MAC address derived from the packet received; and asserting a device address detection signal if there is a match between any of the one or more potential MAC addresses assigned to the networking device and the destination MAC address derived from the packet received.

11. The method of claim 10 wherein the providing step comprises:

providing a first table having N entries, wherein N is an integer greater than one, each entry holding a MAC address prefix;

providing a second table having N entries, each entry holding a MAC address suffix and an index to an entry in the first table holding a corresponding MAC address prefix; and combining each prefix from the first table with a corresponding suffix from the second table to form the pool of N potential MAC addresses.

12. The method of claim 10 wherein the indicating step comprises:

indicating which if any of the plurality of potential MAC addresses match the destination MAC address from the packet.

13. The method of claim 12 wherein the indicating step further comprises:

comparing each of the plurality of potential MAC addresses with the destination MAC address from the packet, and providing a comparison signal for each of the plurality of potential MAC addresses indicating whether there is a match or not.

14. The method of claim 10 wherein the activating step comprises:

providing a first table having a plurality of entries, each entry associated with a particular value of an abstracted VLAN identifier derived from one or more fields in or associated with the packet, including a VLAN field, and each entry indicating for each of the plurality of potential MAC addresses whether that address is to be activated;

providing a second table having a plurality of entries, each entry associated with a particular ingress port and indicating for each of the plurality of potential MAC addresses whether that address is to be activated;

accessing an entry from the first table associated with an AVID derived by applying an indirection mapping process to one or more fields in or associated with the packet, including a VLAN field;

accessing an entry from the second table associated with an ingress port at which the packet was received at the networking device; and checking each of the plurality of potential MAC addresses and activating one or more of these addresses only if both entries agree that the one or more addresses are to be activated.

15. In a networking device capable of presenting different virtual routers to different end users, classes of service, or packets, a MAC address detector comprising:

means for storing a first table having N entries, wherein each entry comprises a MAC address prefix;

means for storing a second table having N entries, each entry comprising a MAC address suffix and an index to an entry in the first table holding a corresponding MAC address prefix;

means for combining each prefix from the first table with a corresponding suffix from the second table to form a pool of N potential MAC addresses of the networking device, wherein N is an integer of one or more;

second addressing means for generating an (N+1)th potential MAC address of the networking device by combining a permanent or semi-permanent, unique identifier of the networking device with a virtual router identifier determined responsive to a packet received at the networking device, the (N+1)th potential MAC address in combination with the N potential MAC addresses forming a plurality of potential MAC addresses that are available for activation and assignment to the networking device;

enable means for activating and assigning one or more of the plurality of potential MAC addresses to the networking device responsive to the packet received at the networking device;

comparison logic for indicating whether any of the one or more potential MAC addresses assigned to the networking device match a destination MAC address derived from the packet received; and detection means for asserting a device address detection signal, to indicate the packet should be routed at OSI layer three rather than switched at OSI layer two, if there is a match between any of the one or more potential MAC addresses assigned to the networking device and the destination MAC address derived from the packet received.

16. The detector of claim 15 wherein the comparison means is for outputting a signal indicating which if any of the plurality of potential MAC addresses match a destination MAC address derived from the packet.

17. The method of claim 10 further comprising:

routing the packet at OSI layer three if the networking device address detection signal is asserted; and switching the packet at OSI layer two if the networking device address detection signal is not asserted.

* * * * *